United States Patent
Chang et al.

(10) Patent No.: US 9,210,568 B1
(45) Date of Patent: Dec. 8, 2015

(54) HARDWARE-CAPABILITY UPDATE METHOD FOR A PORTABLE DEVICE WITH MULTIPLE SIM CARDS

(71) Applicant: MediaTek Inc., Hsin-Chu (TW)

(72) Inventors: Chia-Lan Chang, New Taipei (TW); Jian-Nong Li, Taichung (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/304,127

(22) Filed: Jun. 13, 2014

(51) Int. Cl.
  *H04W 48/18* (2009.01)
  *H04W 8/24* (2009.01)
  *H04W 88/06* (2009.01)

(52) U.S. Cl.
  CPC .............. *H04W 8/245* (2013.01); *H04W 88/06* (2013.01)

(58) Field of Classification Search
  CPC .............................. H04W 48/18; H04W 4/001
  USPC ............. 455/550.1, 551, 552.1, 553.1, 556.1, 455/557, 558, 419
  See application file for complete search history.

(56) References Cited

U.S. PATENT DOCUMENTS

| | | | |
|---|---|---|---|
| 2014/0057679 A1* | 2/2014 | Berionne et al. | 455/558 |
| 2015/0189578 A1* | 7/2015 | van der Laak | 455/419 |
| 2015/0215991 A1* | 7/2015 | Cushing | 455/558 |

* cited by examiner

*Primary Examiner* — Cong Tran
(74) *Attorney, Agent, or Firm* — McClure, Qualey & Rodack, LLP (57) ABSTRACT

A hardware-capability update method for a portable device with at least first and second SIM cards is provided. The method includes detecting whether a hardware capability for a first SIM card has to be responded to a requesting terminal; determining whether the hardware capability for the first SIM card can be responded immediately; transmitting the information about hardware capability to the requesting terminal when the hardware capability for the first SIM card can be responded immediately; and storing the information about pending updated hardware capability when the hardware capability for the first SIM card cannot be responded immediately.

13 Claims, 6 Drawing Sheets

HARDWARE-CAPABILITY UPDATE METHOD FOR A PORTABLE DEVICE WITH MULTIPLE SIM CARDS

BACKGROUND OF THE INVENTION

1. Field of the Invention

The present invention relates to a portable device, and more particularly to a portable device with multiple SIM cards.

2. Description of the Related Art

With the rapid development of the technologies used by electronic devices with multiple Subscriber Identity Module (SIM) cards, consumers who previously had to carry two or more cell phones are today able to use two or more phone numbers at the same time by inserting the respective SIM cards into a single electronic device. An electronic device that includes multiple SIM cards is able to concurrently use two or more network services and is able to provide the user with separate phone numbers: one for personal use and another for business purposes, for example.

However, the hardware resources of electronic devices are fixed. When a service or operation of a first SIM card is executed, the hardware resources available to a second SIM card are therefore reduced. If the second SIM card is triggered, the second SIM card reports its hardware capability to a service provider, and the reported hardware capability is not adjusted according to the hardware resources used by the first SIM card. This may reduce the efficiency of the electronic device and affect its fluency of operation.

BRIEF SUMMARY OF THE INVENTION

A hardware-capability update method for a portable device with at least first and second SIM cards is provided. The method comprises detecting whether a hardware capability for a first SIM card has to be responded to a requesting terminal; determining whether the hardware capability for the first SIM card can be responded immediately; transmitting the information about hardware capability to the requesting terminal when the hardware capability for the first SIM card can be responded immediately; and storing the information about pending updated hardware capability when the hardware capability for the first SIM card cannot be responded immediately.

A device capable of dynamically updating hardware capability for at least first and second SIM cards is provided. The device comprises a controller to execute a hardware-capability update method for the first and second SIM cards. The method comprises detecting whether a hardware capability for a first SIM card has to be responded to a requesting terminal; determining whether the hardware capability for the first SIM card can be responded immediately; transmitting the information about hardware capability to the requesting terminal when the hardware capability for the first SIM card can be responded immediately; and storing the information about pending updated hardware capability when the hardware capability for the first SIM card cannot be responded immediately.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
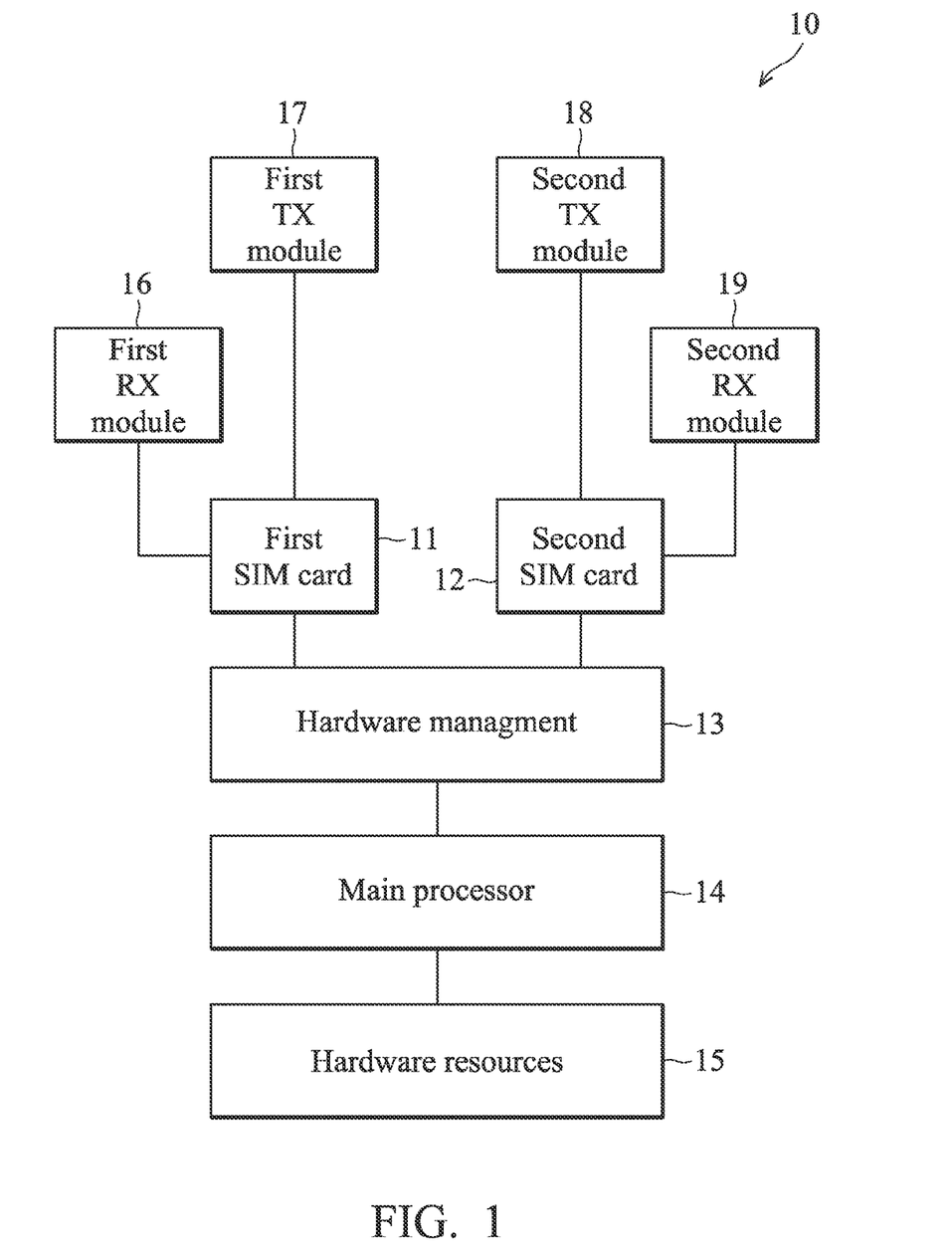
FIG. 1 is a schematic functional block diagram of a portable device according to an embodiment of the invention.

FIG. 1 is a schematic functional block diagram of a portable device according to an embodiment of the invention. The portable device 10 comprises a first SIM card 11, a second SIM card 12, a hardware management circuit 13, a main processor 14, hardware resources 15, a first RX module 16, a second RX module 19, a first TX module 17 and a second TX module 18. The first RX module 16 and the second RX module 19 are implemented by hardware circuits and are dedicated to the first SIM card 11 and the second SIM card 12, respectively. In FIG. 1, the portable device 10 is illustrated with two transmitting modules, the first TX module 17 and the second TX module 18, but the invention is not limited thereto. In another embodiment, the portable device 10 may include only one transmitting module, and the first SIM card 11 and the second SIM card 12 share the transmitting module according to priority, settings, or other parameters.

The module cited in the above paragraphs is implemented by hardware devices, and may include chips, circuits, controllers, storage devices, firmware and/or other necessary elements. The module is a relatively compact unit in an electronic device and is designed to be installed, replaced, and serviced separately. The definition of the module is also applied to the module in the following paragraph.

The term "hardware resources" 15 is a collective term that in a portable device may refer to available memory, network connection abilities, available processor usage, hardware for soft bits, cache, HARQ (Hybrid Automatic Repeat reQuest) and other hardware or software resources that can be used by the SIM card. In another embodiment, the hardware resources may be called "hardware capability". For example, when a network station or a base station transmits a hardware-capability update request to the first SIM card 11 via the first RX module 16, the hardware management circuit 13 checks the hardware resources 15 and updates a hardware-capability content indicating which hardware can be used by the first SIM card 11 or how many resources of a specific piece of hardware can be shared by the first SIM card 11.

Assuming that the maximum throughput of a network connection of the portable device 10 is 20 Mbps, and only 8 Mbps is available to the first SIM card 11, the hardware management circuit 13 records the 8 Mbps network throughput in the information about hardware capability. Assuming that the maximum throughput of the network connection of the portable device 10 is 20 Mbps, and network requirements for service for the first SIM card 11 are 10 Mbps, the hardware management circuit 13 records the 10 Mbps network throughput in the information about hardware capability.

After the hardware management circuit 13 updates the information about hardware capability, the first SIM card 11 transmits the information about hardware capability to a corresponding device via the first TX module 17. In FIG. 1, the main processor 14 processes almost all the procedures, tasks or processes according to the operation of the portable device 10, except the updating of information about hardware capability. In one embodiment, the hardware management circuit 13 is a controller. In another embodiment, the hardware management circuit 13 can be replaced by software executed by a processor or a controlling device.

Figure 2:
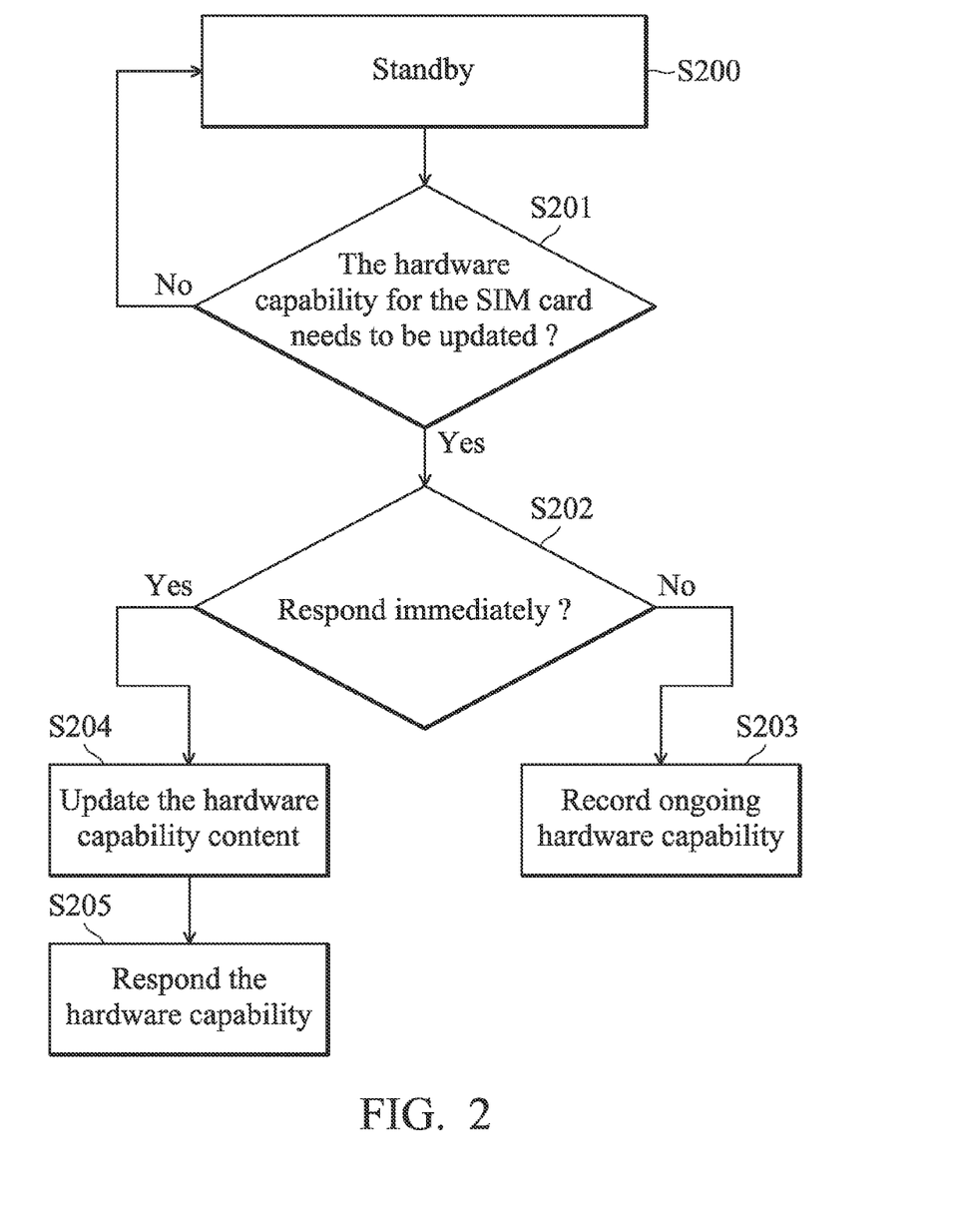
FIG. 2 is a flowchart of a hardware-capability update method for a portable device with multiple SIM cards according to an embodiment of the invention.

FIG. 2 is a flowchart of a hardware-capability update method for a portable device with multiple SIM cards according to an embodiment of the invention. In step S201, a controller determines whether the hardware capability for the SIM card needs to be updated. In one embodiment, the controller detects whether a SIM card is triggered and a protocol stack or a modem of the portable device has to respond with information regarding hardware capability corresponding to the SIM card. The protocol stack is an implementation of a computer networking protocol suite. The suite is the definition of the protocols, and the stack is the software implementation of them. The term stack also refers to the actual software that processes the protocols. So, for example, programmers talk about loading a stack, which means to load the software required to use a specific set of protocols. In the following paragraph, the protocol stack or the modem of the portable device is referred to as a responding unit.

In some situations, the responding unit has to respond with information about hardware capability that can be used by the SIM card to a network terminal, such as a base station or a network station, and the network terminal therefore knows the transmission/reception data throughput supported by the portable device, the upload and download category of the portable device, or other information relating to the portable device.

If the responding unit has to respond with information about hardware capability that can be used by the SIM card, step S202 is executed. If not, the SIM card stays in standby mode. In step S202, the controller determines whether the hardware capability can be responded to the network terminal immediately. If not, step S203 is executed. The controller records the current hardware capability and the responding unit awaits instructions to transmit the information about hardware capability to the network terminal. In another embodiment, the responding of hardware capability is recorded as a task, and when the controller determines that the hardware capability can be responded to the network terminal, the task is then executed. When the task is executed, the controller may update the current hardware capability and the responding unit responding with the current hardware capability to the network terminal.

If the hardware capability can be immediately responded to the network terminal, the controller first updates the hardware resources available to the SIM card in step S204, and then the responding unit transmits the information about hardware capability to the network terminal in step S205.

Figure 3:
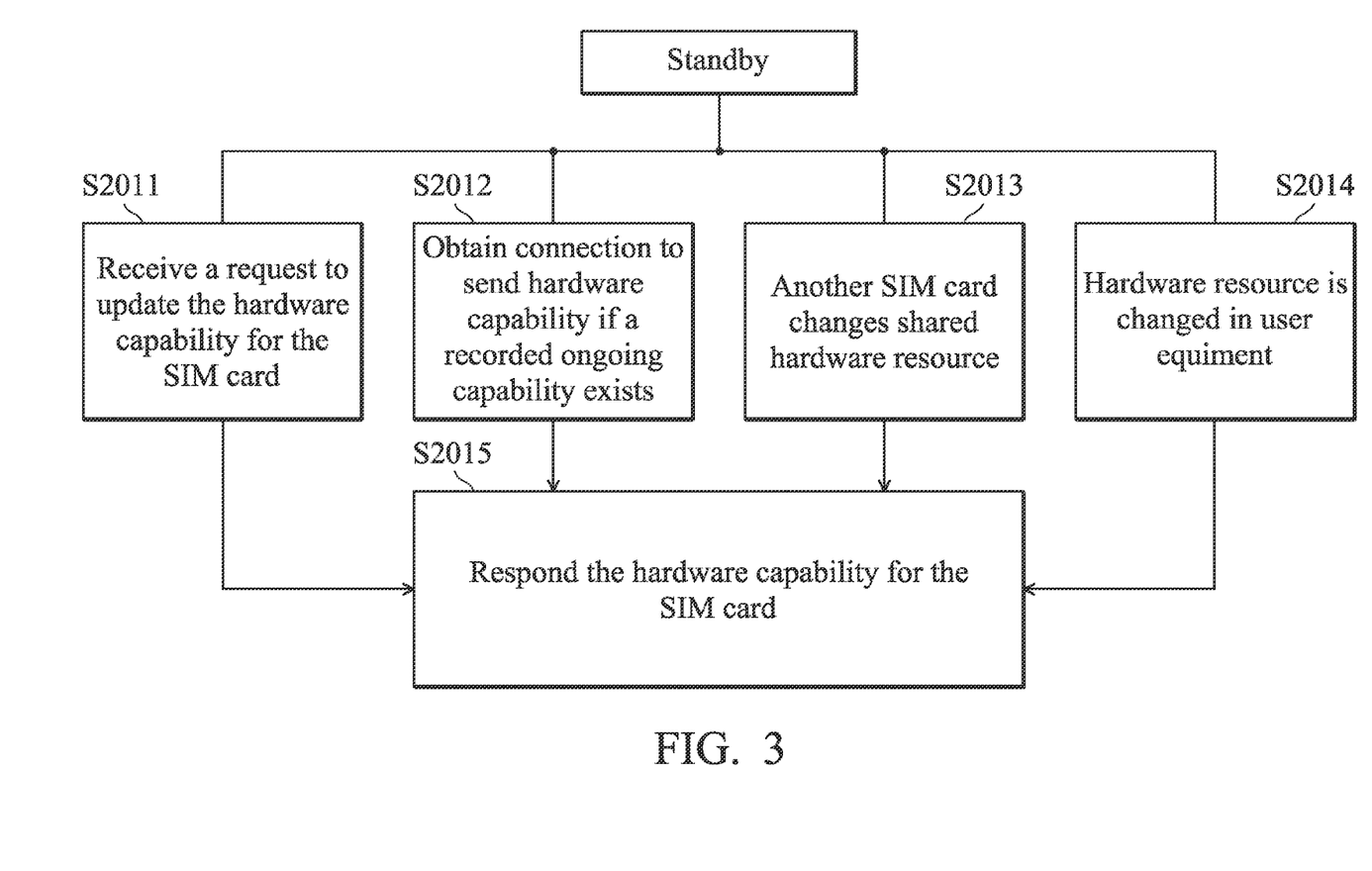
FIG. 3 is a flowchart showing a detail of step S201 in FIG. 2.

FIG. 3 is a flowchart showing a detail of step S201 in FIG. 2. In FIG. 3, four situations for determining whether the hardware capability for the SIM card needs to be updated are provided. In step S2011, the controller determines whether the SIM card has received a request to respond with information regarding hardware capability. This situation often occurs when the portable device establishes connection with network. If the controller receives the request, the current hardware capability for the SIM card needs to be responded in step S2015. After step S2015 is executed, the procedure goes to step S202 in FIG. 2. Step S203 in FIG. 2 describes how the responding unit cannot respond immediately to the network terminal with information about current hardware capability for the SIM card because the network connection is disconnected, the shared TX module is being used by another SIM card, or another reason. Thus, in step S2012, when the controller determines that the network connection between the SIM card and the network terminal has been re-established, or that the SIM card has the right to access the shared TX module, the responding unit transmits the recorded hardware capability to the network terminal. In another embodiment, the controller may check whether the current hardware capability matches the recorded hardware capability, and updates the information on hardware capability whenever the hardware capability changes.

The situation in step S2013 occurs when a protocol stack or modem corresponding to another SIM card (a second SIM card) changes its services and causes the shared hardware resources to change. Since the hardware resources being used by the second SIM card have changed, the hardware resources available to the SIM card (the first SIM card) also change. Thus, the hardware capability for the first SIM card needs to be updated. The situation pertaining to step S2014 occurs when the hardware configuration of the portable device changes. Since the user may disable the Bluetooth module, for example, the SIM card needs to update its hardware-capability information to avoid errors between the portable device and the network terminal. In another example, the SIM card may support two network protocols, such as 3G protocol and 4G protocol, and if the 4G protocol is not available in the portable device, the SIM card has to update the information about hardware capability and transmit the updated hardware-capability information to the network terminal. Then, the network terminal knows to establish a 3G network connection, not a 4G network connection, between the portable device and the network terminal.

Figure 4:
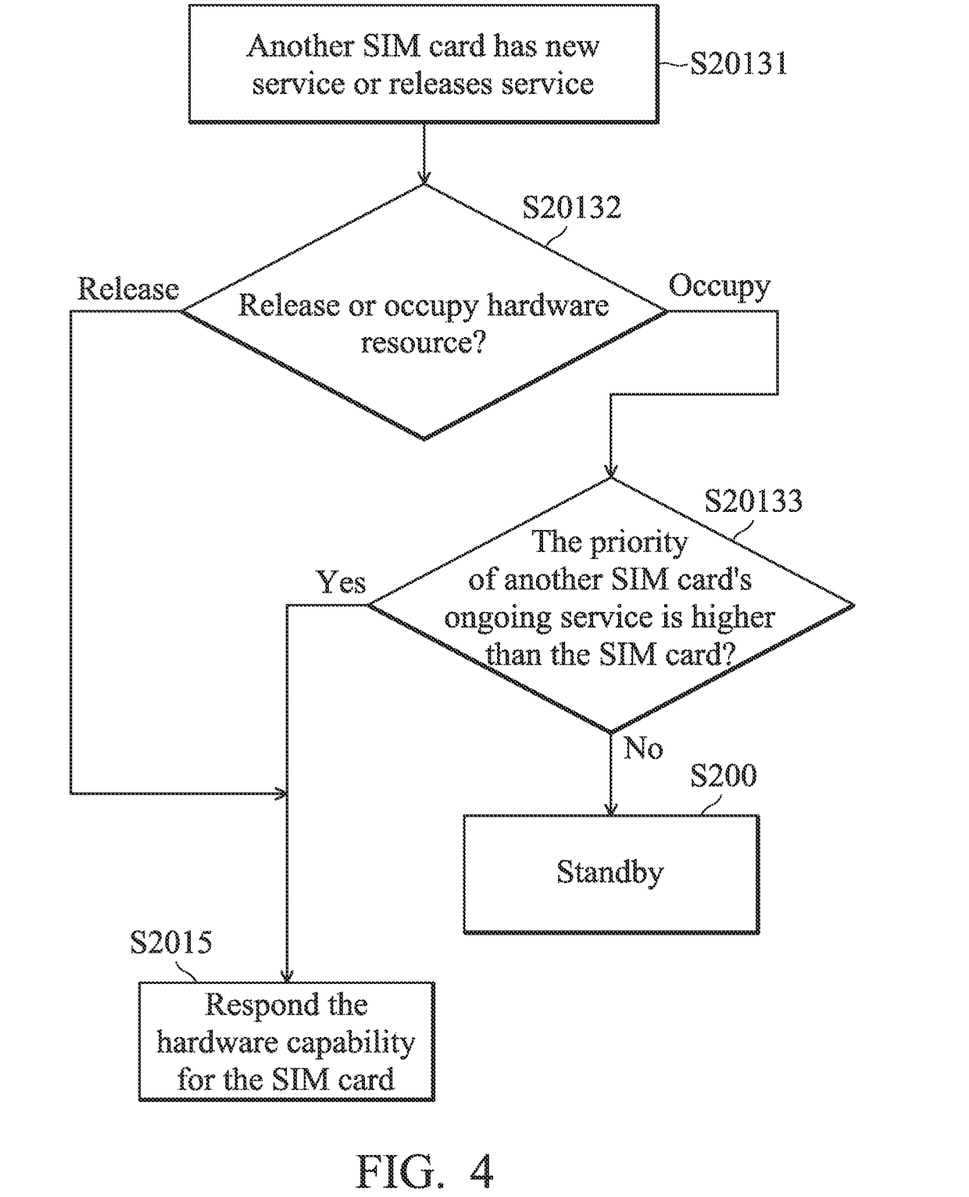
FIG. 4 is a flowchart showing a detail of step S2013 in FIG. 3.

FIG. 4 is a flowchart showing a detail of step S2013 in FIG. 3. In step S20131, the controller detects whether anther SIM card (the second SIM card) has new service or releases service. If not, the controller does nothing. If yes, step S20132 is then executed. In step S20132, the controller first checks whether the second SIM card is using more hardware resources or releasing hardware resources due to the change in services. If the controller determines that the second SIM card has released hardware resources, the procedure goes to step S2015 in FIG. 4 and the updated information about the hardware capability for the first SIM card is responded. If the controller determines that the second SIM card is using more hardware resources, the controller first determines whether the new ongoing service is preempting the services of the first SIM card in step S20133. If yes, the procedure goes to step S2015 and the hardware capability for the first SIM card is responded. If not, the procedure returns to step S200.

Figure 5:
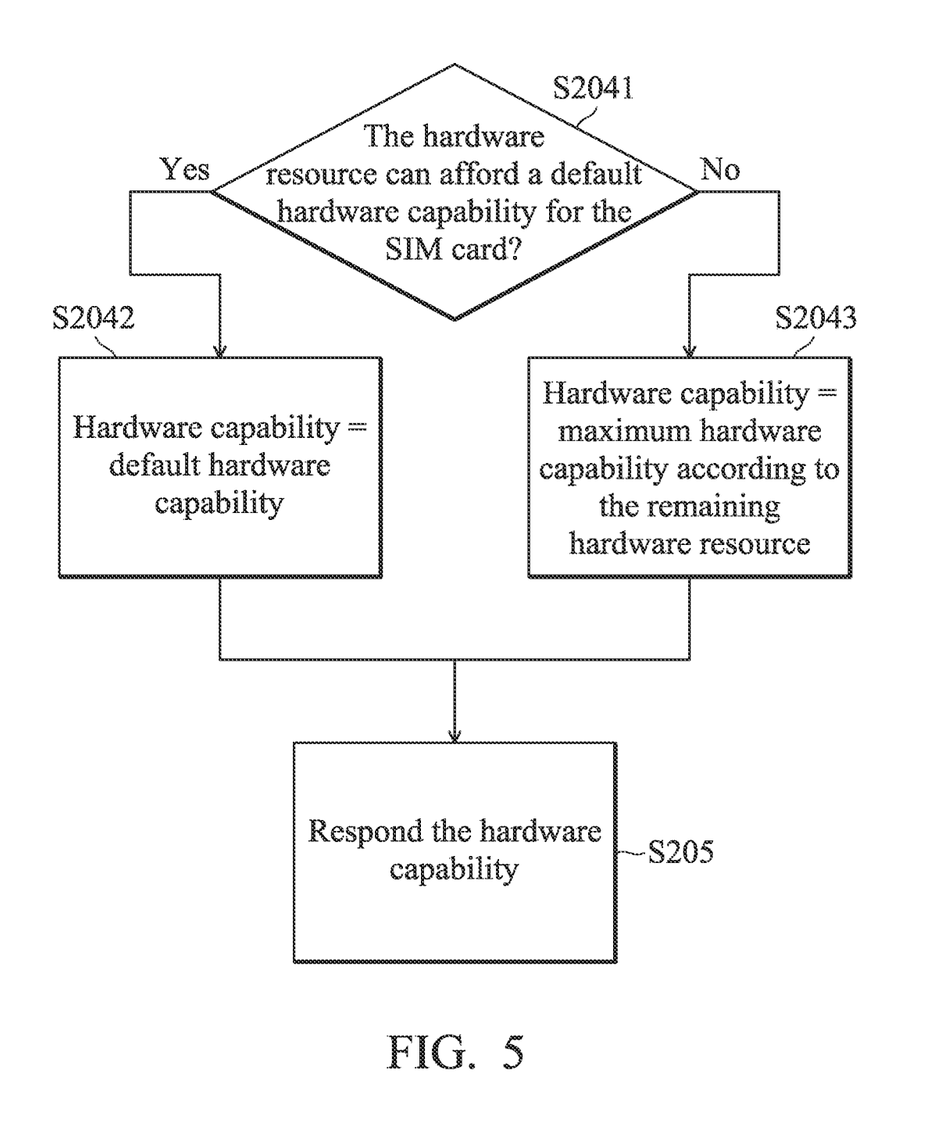
FIG. 5 is a flowchart showing a detail of step S204 in FIG. 2.

FIG. 5 is a flowchart showing a detail of step S204 in FIG. 2. In step S2041, the controller determines whether the current hardware resources can accommodate the default hardware capability of the SIM card. If yes, the controller updates the hardware-capability information according to the default hardware capability in step S2042. In other words, the information about hardware capability responded to the requesting terminal is the default hardware capability. If the controller determines that the current hardware resources cannot accommodate the default hardware capability, the controller estimates the maximum hardware capability of the SIM card according the current hardware resources in step S2043. For example, if a default download throughput capability for the SIM card is 4 Mbps, and the current download throughput capability is only 8 Mbps, the controller then determines that the available hardware capability of the download throughput for the SIM card is 8 Mbps.

Figure 6:
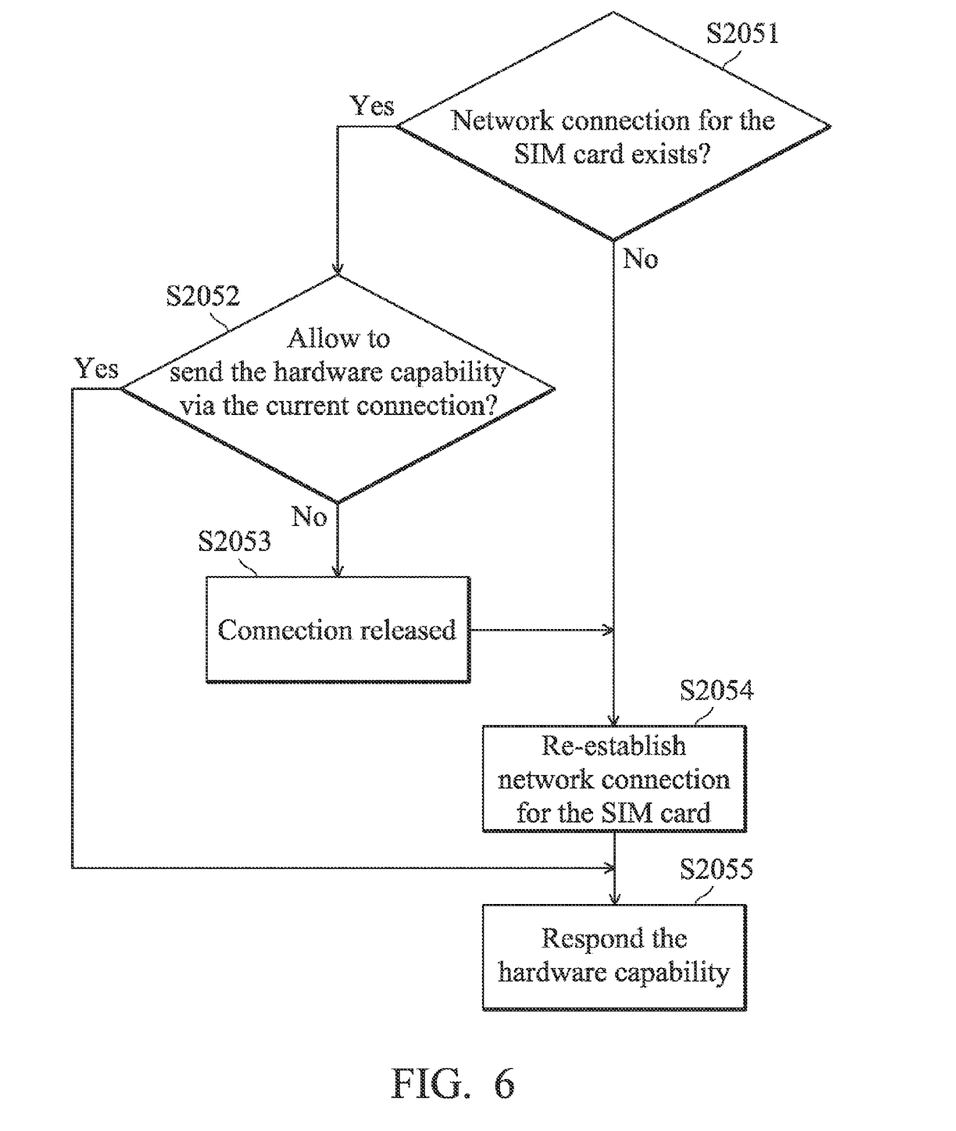
FIG. 6 is a flowchart showing a detail of step S205 in FIG. 2.

FIG. 6 is a flowchart showing a detail of step S205 in FIG. 2. In step S2051, the controller determines whether a network connection exists between the portable device and the network terminal. If such a network connection does not exist, the SIM card re-establishes a network connection between the portable device and the network terminal in step S2054. If such a network connection exists, the controller further determines whether the SIM card can respond with information about hardware capability via the current network connection in step S2052. If yes, the hardware capability for the SIM card is responded to the network terminal in step S2055. If not, the SIM card releases the current connection in step S2053 and re-establishes a network connection between the portable device and the network terminal in step S2054, and the SIM card responds with information about the hardware capability to the network terminal after the network connection has been re-established.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A hardware-capability update method for a portable device with at least first and second SIM cards, comprising:
   detecting whether a hardware capability for a first SIM card has to be responded to a requesting terminal;
   determining whether the hardware capability for the first SIM card can be responded immediately;
   transmitting the information about hardware capability to the requesting terminal when the hardware capability for the first SIM card can be responded immediately; and
   storing the information about pending updated hardware capability when the hardware capability for the first SIM card cannot be responded immediately;
   wherein the hardware capability for the first SIM card is updated when hardware resources being used by the second SIM card change.

2. The method as claimed in claim 1, wherein a detection step is implemented by detecting whether there is a request from a network asking the hardware capability for the first SIM card.

3. The method as claimed in claim 1, further comprising:
   determining whether the second SIM card is using more hardware resources or releasing hardware resources;
   when the second SIM card releases hardware resources, the first SIM card does not change the hardware capability; and
   when the second SIM card is using more hardware resources, the hardware capability for the first SIM card is modified according to current hardware resources.

4. The method as claimed in claim 1, wherein the hardware capability for the first SIM card is updated when a hardware configuration of the portable device changes.

5. The method as claimed in claim 1, wherein when a network connection is available, the pending hardware capability for the first SIM card is responded to the requesting terminal.

6. The method as claimed in claim 1, further comprising:
   checking whether current hardware resources can accommodate a default hardware capability of the first SIM card;
   determining that the hardware capability is the default hardware capability when the current hardware resources can accommodate the default hardware capability of the first SIM card; and
   determining that the hardware capability is a maximum hardware capability according to the current hardware resources when the current hardware resources cannot accommodate the default hardware capability of the first SIM card.

7. The method as claimed in claim 1, further comprising:
   checking whether a network connection exists, over which the stored information about hardware capability can be transmitted;
   transmitting the stored information about hardware capability to the requesting terminal when the network connection exists and is available to the first SIM card; and
   re-establishing a new network connection to transmit the stored information about hardware capability to the requesting terminal when the network connection does not exist or is not available to transmit the information about hardware capability.

8. A device capable of dynamically updating hardware capability for at least first and second SIM cards, comprising:
   a controller to execute a hardware-capability update method for the first and second SIM cards, wherein the method comprises:
   detecting whether a hardware capability for a first SIM card has to be responded to a requesting terminal;
   determining whether the hardware capability for the first SIM card can be responded immediately;
   transmitting the information about hardware capability to the requesting terminal when the hardware capability for the first SIM card can be responded immediately; and
   storing the information about pending updated hardware capability when the hardware capability for the first SIM card cannot be responded immediately;
   wherein the hardware capability for the first SIM card is updated when hardware resources being used by the second SIM card change.

9. The device as claimed in claim 8, wherein the detection step is implemented by detecting whether there is a request from a network asking hardware capability for the first SIM card.

10. The device as claimed in claim 8, wherein the method further comprises:
    determining whether the second SIM card is using more hardware resources or releasing hardware resources;
    when the second SIM card releases hardware resources, the first SIM card does not change the information about hardware capability; and
    when the second SIM card is using more hardware resources, the hardware capability for the first SIM card is modified according to current hardware resources.

11. The device as claimed in claim 8, wherein the hardware capability for the first SIM card is updated when a hardware configuration of the portable device changes.

12. The device as claimed in claim 8, wherein the method further comprises:
    checking whether current hardware resources can accommodate a default hardware capability of the first SIM card;
    determining that the hardware capability is the default hardware capability when the current hardware resources can accommodate the default hardware capability of the first SIM card; and determining that the hardware capability is a maximum hardware capability according to the current hardware resources when the current hardware resources cannot accommodate the default hardware capability of the first SIM card.

13. The device as claimed in claim 8, wherein the method further comprises:

checking whether a network connection exists, over which the stored information about hardware capability can be transmitted;

transmitting the stored information about hardware capability to the requesting terminal when the network connection exists and is available to the first SIM card; and re-establishing a new network connection to transmit the stored information about hardware capability to the requesting terminal when the network connection does not exist or is not available to transmit information about hardware capability.

\* \* \* \* \*